US012798444B2

(12) United States Patent
Skipper

(10) Patent No.: US 12,798,444 B2
(45) Date of Patent: Nov. 17, 2026

(54) ALERTING VEHICLE SEAT BELT DEVICE

(71) Applicant: Kevin Skipper, Calabash, NC (US)

(72) Inventor: Kevin Skipper, Calabash, NC (US)

( * ) Notice: Subject to any disclaimer, the term of this patent is extended or adjusted under 35 U.S.C. 154(b) by 0 days.

(21) Appl. No.: 19/180,422

(22) Filed: Apr. 16, 2025

(65) Prior Publication Data

US 2026/0158970 A1 Jun. 11, 2026

Related U.S. Application Data

(60) Provisional application No. 63/636,919, filed on Apr. 22, 2024.

(51) Int. Cl.

| | |
|---|---|
| ***B60R 21/015*** | (2006.01) |
| ***B60N 2/00*** | (2006.01) |
| ***B60Q 5/00*** | (2006.01) |
| ***H04W 4/40*** | (2018.01) |

(52) U.S. Cl.

CPC ........... *B60N 2/0021* (2023.08); *B60Q 5/005* (2013.01); *H04W 4/40* (2018.02)

(58) Field of Classification Search

CPC .... B60N 2210/12; B60N 2/002; B60N 2/274; B60N 2/271; B60R 21/01556; B60R 21/01546

See application file for complete search history.

(56) References Cited

U.S. PATENT DOCUMENTS

| | | | | |
|---|---|---|---|---|
| 9,424,728 | B2 | 8/2016 | Rambadt et al. | |
| 9,527,477 | B1 | 12/2016 | Cech et al. | |
| 11,370,326 | B2 * | 6/2022 | Adkar | B60K 35/10 |
| 2016/0272150 | A1 * | 9/2016 | Doshi | G08B 23/00 |
| 2020/0094709 | A1 * | 3/2020 | Dutkin | B60R 99/00 |

OTHER PUBLICATIONS

Internet publication https://bucklemeup.com/ published May 17, 2014.

* cited by examiner

*Primary Examiner* — Kenneth J Malkowski

(74) *Attorney, Agent, or Firm* — P. Jeff Martin; The Law Firm of P. Jeffrey Martin, LLC

(57) ABSTRACT

An example may include creating a message via a monitoring device disposed in a buckle of the seat, transmitting the message via the monitoring device to one or more of the device and the vehicle, responsive to determining the seat is occupied, monitoring, via the device, a seat belt status associated with the seat until a change in vehicle status, and determining to create the alert, via the device, when the vehicle status has changed from being operated to the stopped operation and when the seat belt status is engaged and the device has exceeded a distance between the device and the vehicle.

14 Claims, 6 Drawing Sheets

200

200

300

500

ALERTING VEHICLE SEAT BELT DEVICE

RELATED APPLICATIONS

The present application claims priority to U.S. Provisional Patent Application No. 63/636,919, filed on Apr. 22, 2024, the disclosure of which is hereby incorporated by reference in its entirety.

FIELD OF INVENTION

The present invention relates to a seat belt alert device and more particularly to a seat belt device that alerts others regarding an occupancy status of a seat and the seat belt.

BACKGROUND OF THE INVENTION

Conventionally, a seat belt is a mechanical device that provides little to no feedback regarding a use status. Most vehicles today alert the vehicle occupants when a seat belt is not being used and a person or weight is detected as being present on a particular seat. Alerts do not include other scenarios such as an alert that the seat belt was never released and/or notifying designated users based on proximity and other factors.

SUMMARY OF THE INVENTION

Example embodiments of the present application disclose hardware, software and/or operations and procedures configured to provide receiving a wireless communication signal comprising a confirmation that a seat belt buckle has been engaged, monitoring the seat belt status until a change in vehicle status, and receiving an alert when the vehicle status has changed and the seat belt is engaged and a mobile device associated with the seat belt has exceeded a distance.

One example embodiment may include receiving a message at a device comprising a confirmation a seat has been occupied in a vehicle, responsive to receiving the message, determining, via the device, the vehicle is being operated, determining, via the device, that the vehicle has stopped operation for a period of time, determining, via the device, the seat is still occupied after the period of time, and creating, via the device, an alert notification indicating the seat is occupied.

Another example embodiment may include a device that includes a receiver configured to receive a message comprising a confirmation a seat has been occupied in a vehicle, and a processor configured to responsive to the message being received, determine the vehicle is being operated, determine that the vehicle has stopped operation for a period of time, determine the seat is still occupied after the period of time, and create an alert notification indicating the seat is occupied.

Yet another example embodiment may include a non-transitory computer readable storage medium configured to store instructions that when executed cause a processor to perform receiving a message at a device comprising a confirmation a seat has been occupied in a vehicle, responsive to receiving the message, determining, via the device, the vehicle is being operated, determining, via the device, that vehicle has stopped operation for a period of time, determining, via the device, the seat is still occupied after the period of time, and creating, via the device, an alert notification indicating the seat is occupied.

BRIEF DESCRIPTION OF THE DRAWING(S)

DETAILED DESCRIPTION OF THE EMBODIMENT(S)

Figure 1:
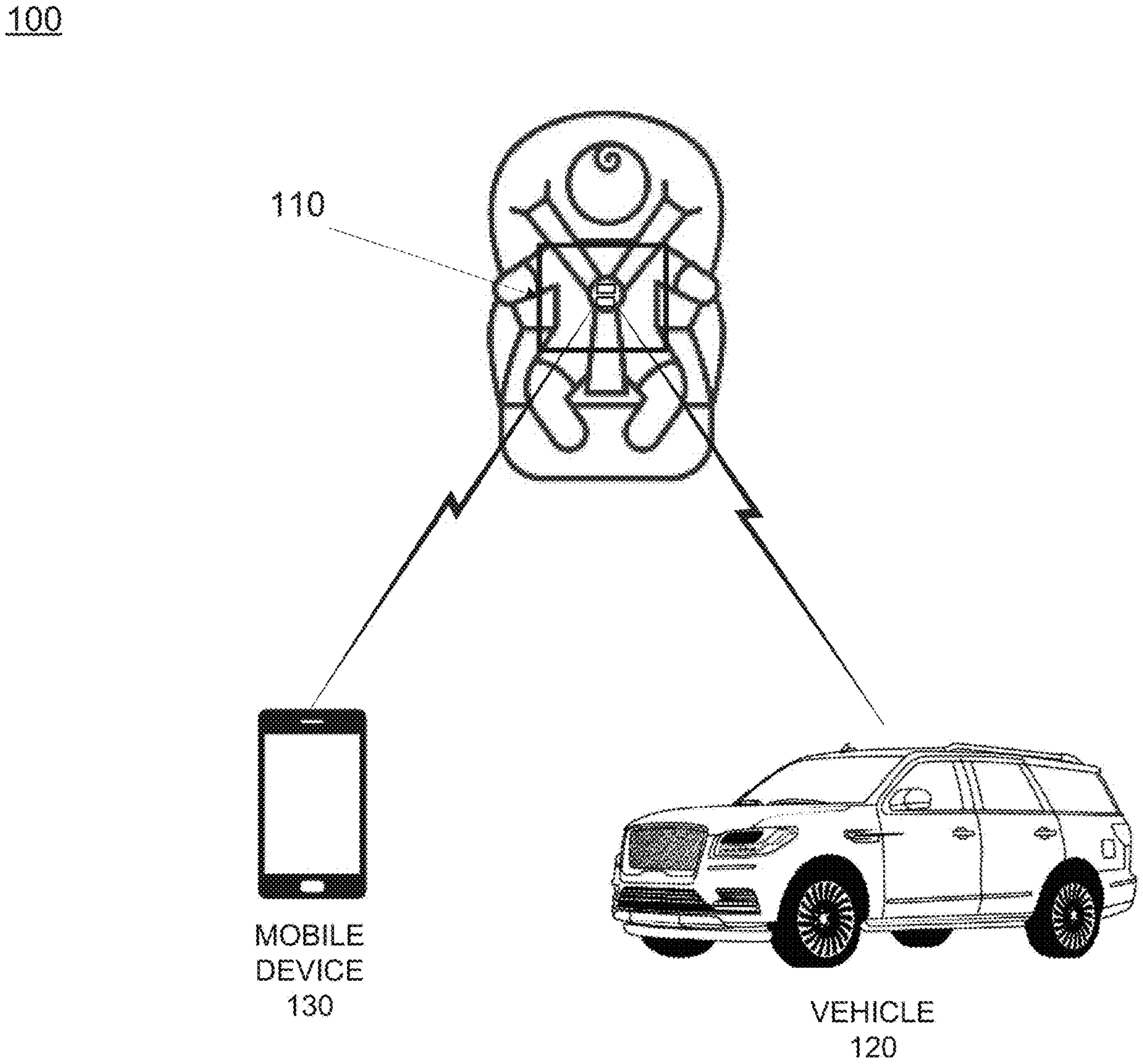
FIG. 1 illustrates a child car seat with a seat belt configuration that includes an overlay notification system according to example embodiments.

Example embodiments provide a seat belt detection and alert system, the system includes an automobile seat belt having a latch or plate tongue member on one end and a cavity buckle member on the opposing end to receive the plate tongue. The latch and buckle ends are each integrated with electronics and activation components which may include an actuator or switch that is 'open circuit' and which become 'closed circuit' when the latch is inserted into the cavity buckle portion. A wireless transmitter may use Wi-Fi, BLUETOOTH and/or other communication protocols to transmit a signal to the vehicle, a mobile device, or other components, etc., to alert any one or more of those devices that the seat belt is activated. A mobile phone application may be used to provide an interface for tracking the active status of the seat belt, such as engaged (closed) or not engaged (open). The reminders used to indicate that a seat belt is engaged may include triggering an alarm when the vehicle stops moving and/or when the mobile device begins to move away from the vehicle. A threshold distance (e.g., 10 feet, 20 feet, etc.) may cause the alert to be sent to the user's mobile device to inform about an active seat belt.

An alert configuration that overlays onto an existing seat belt may provide an added reminder to the mobile device user that a person may still be sitting in the vehicle, which may be critical in extreme weather and in situations where the driver is having a health concern or is otherwise impaired. A vehicle software may use BLUETOOTH to receive an activation signal when the latch plate and buckle are latched/detachably coupled. A hard wire circuit may trigger a wireless signal to be sent to the vehicle operating system and/or a user's mobile device. The hard wire circuit may initiate when the metal from the tongue enters the belt cavity. Another option is to have a near field communication (NFC) antenna on one side of the buckle or within the buckle. As the buckle is brought within a few inches of the tongue side of the seat belt, the NFC activates and sends a signal to the vehicle and/or the mobile device user's phone via a different communication protocol, such as BLUETOOTH or Wi-Fi.

Activating the transmitter of the seat belt overlay system to wirelessly transmit a signal to the mobile phone application may enable the mobile phone application to produce a visual and/or audible indicator to alert the user of the mobile phone that the seat belt is activated and ready for monitoring. The system may be deactivated upon unbuckling of the latch plate and the buckle manually, which may trigger a release signal. The application also provides a visual and/or an audible indicator (such as a loud alarm) to the user or to other people (i.e., phone number) when the buckle is latched and the system is armed/activated or that the buckle is unlatched and the BLUETOOTH connection is lost, the mobile phone application may also be configured to include an indicator which may produce high volume sounds, repeated verbal statements and/or flashing lights when the vehicle has remained stationary over a predetermined time interval (e.g., 5 mins.) while the seat belt remains buckled.

The mobile phone application may also be configured to produce "alerts" in the form of audible indicators, such as audibly notifying the user of the distance remaining to a previously inputted destination, and other indicators such as audible and visual, (e.g., high volume sounds, audible verbal comments, flashing lights, etc.), to alert the user (driver) that his/her child is still seated and buckled in the automobile once reaching the destination, and the mobile phone application may be configured to enable the user to track the vehicle by GPS while the seat belt is buckled.

In one example, the system is activated when the latch plate/tongue and buckle/cavity are latched/detachably coupled, activating a wireless transmitter to transmit a signal to a mobile phone or other device. The initial signal may activate the mobile phone application and enable mobile phone monitoring of the seat belt status and whether the seat belt is engaged while the device is located in a particular location. This may include producing a visual and/or audible indicator (or similar indicator) to alert the user the mobile phone application is setup for operation. The system may be deactivated upon unbuckling the latch plate and the buckle manually, the application may also provide a visual and/or an audible indicator (such as a loud alarm) to the user or to other people (i.e., a called phone number) when the buckle is latched and the system is armed/activated or that the buckle is unlatched and the wireless connection is lost. The mobile phone application may also be configured to include an indicator which may produce high volume sounds, repeated verbal statements and/or flashing lights when the vehicle has remained stationary over a predetermined time interval (e.g., 5 minutes) while the seat belt remains buckled. Another option may be a temperature sensor inside the buckle module which triggers an alarm when a temperature is exceeded (i.e., 90 degrees Fahrenheit).

The mobile phone application may also be configured to produce "alerts" in the form of audible indicators, such as audibly notifying the user device of the distance remaining to a previously inputted destination, and other indicators such as audible and visual notifications, (e.g., high volume sounds, audible verbal comments, flashing lights), to alert the user (driver) that his/her child is still seated and buckled in the automobile once reaching a destination. Another example may include a strap that is placed around the tongue portion of the seat buckle and a strap that is disposed around the buckle portion that has its own buckle that clicks into the tongue portion as separate entities that overlay on the existing buckle configuration. When the two components are connected together, an activation signal will cause a communication connection signal to be sent to one or more other devices that support the notification application.

FIG. 1 illustrates a child car seat with a seat belt configuration that includes an overlay notification system according to example embodiments. Referring to FIG. 1, the configuration 100 includes a baby car seat including a seat belt configuration with a communication overlay unit 110 that can alert third parties which are registered to receive alerts. The communication elements of the overlay unit 110 may include a battery, a memory, a processor, a digital readable medium to store instructions, and other components, such as a TX/RX pair. When the buckle on the car seat is closed, the mobile device 130 may receive a message indicating the buckle status and other data, such as a temperature, a timer tracking an amount of time the buckle is in a closed position, and a distance estimated between the unit 110 and the mobile device 130, which may be measured by a power signal estimation technique performed by the mobile device 130, a GPS estimation procedure that tracks a location of the unit 110 or a combination of all such tracking options.

Figure 2A:
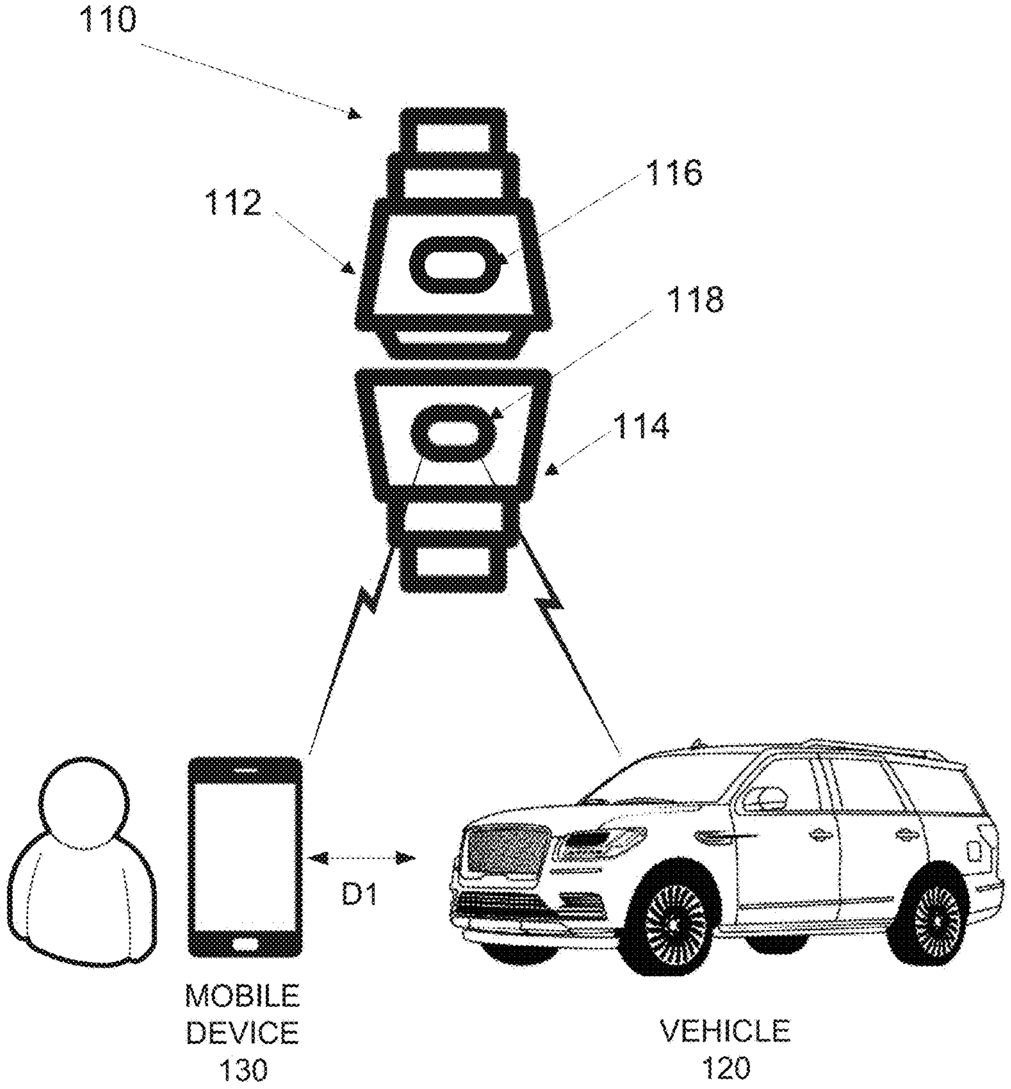
FIG. 2A illustrates a close view of the seat belt configuration including a tongue/insert portion and a receiving/cavity portion which when connected activate a communication signal and a distance determining procedure according to example embodiments.

FIG. 2A illustrates a close view of the seat belt configuration including a tongue/insert portion and a receiving/cavity portion which when connected activate a communication signal and a distance determining procedure according to example embodiments. Referring to FIG. 2A, the example 200 includes a buckle configuration 110 which includes a tongue portion 112 with a connection unit 116 and a cavity portion 114 with a connection unit 118. The connection units 116/118 may be physical connection elements which touch in a closed position, such as conduits that connect by a snap configuration and/or other affixing elements. The connection units may include a transmitter/receiver pair that communicate by BLUETOOTH signals and/or a NFC antenna or some other wireless communication protocol that create a connection status, such as closed or open depending on how close the buckle portions 112/114 are in proximity to one another. A vehicle 120 may be the location of the seat belt configuration 110. The connection units 116/118 may transmit a communication signal to a vehicle computing device inside the vehicle 120 and/or the mobile device 130. All of the sensors, control features and hardware may be inside the buckle compartment. When the vehicle is being driven, has stopped, etc., the distance D1 between the mobile device 130 and the buckle configuration 110 inside the vehicle 120 may be inside a distance threshold ($D_{th}$). When the distance between device 130 and unit 110 is less than $D_{th}$, then there may be no alarm or notification created. This distance $D_{th}$ may be about 10, 15, 20 feet or less. Again, the buckle configuration 110 may be located inside the vehicle 120 in a fixed seat position.

Figure 2B:
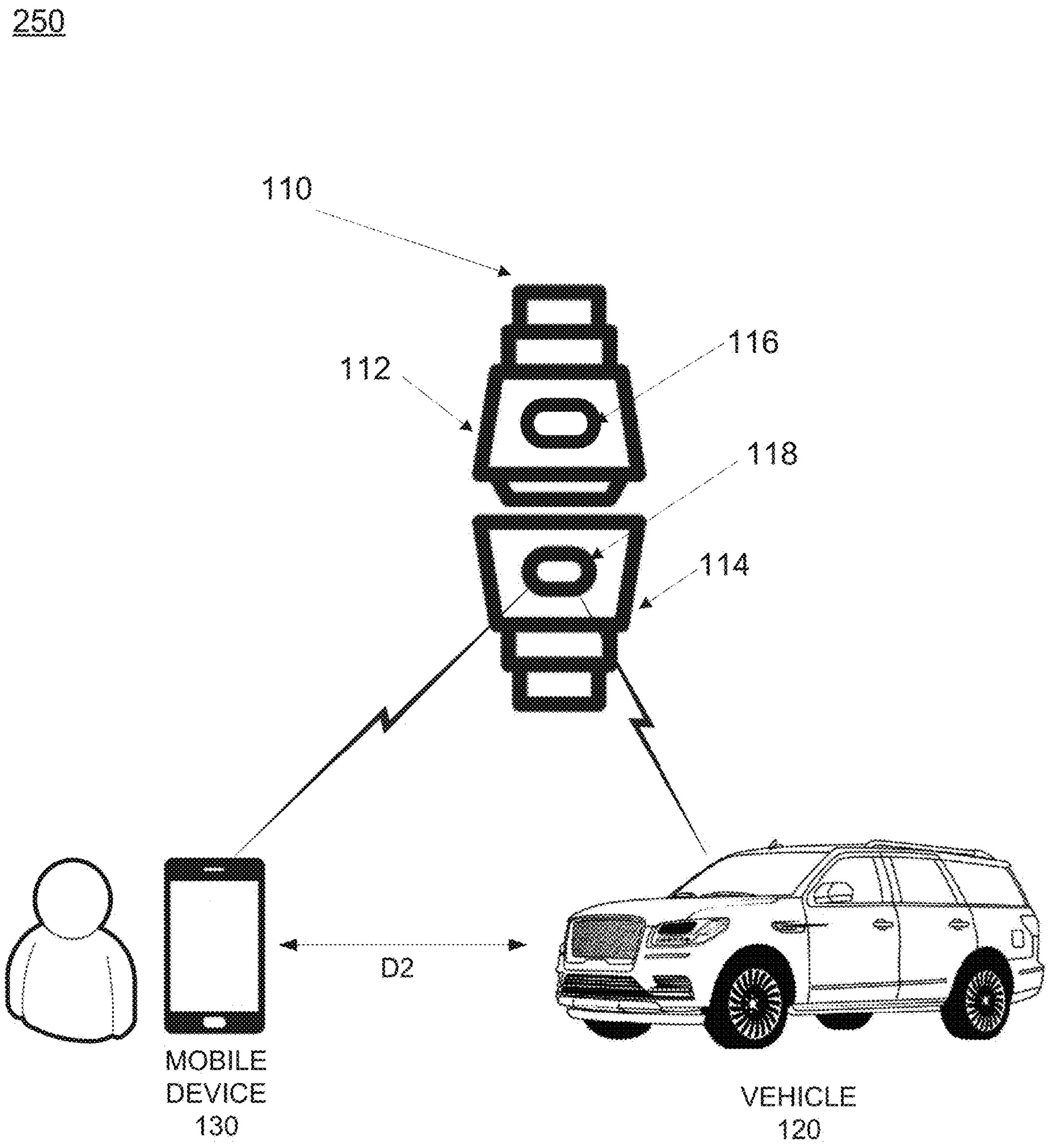
FIG. 2B illustrates another close view of the seat belt unit being tracked to exceed a distance from the mobile device according to example embodiments.

FIG. 2B illustrates another close view of the seat belt unit being tracked to exceed a distance from the mobile device according to example embodiments. Referring to FIG. 2B, in the example 250, the user may have exited the vehicle 120 with the mobile device 130. The buckle configuration unit 110 may have sent beacon messages to the mobile device 130 the entire time it was engaged during the vehicle use 120. Once the mobile device 130 was able to confirm the distance D2 was greater than $D_{th}$ the mobile device may create the alarm notification. The alarm notification may be sent from the mobile device back to the vehicle 120 in addition to engaging a notification on the mobile device 130. In one example, the mobile device 130 may initiate a remote start function that causes the vehicle to start up, honk a horn, flash lights, etc. All of the notification efforts are made to notify the user of the fact that the seat buckle is still engaged and to retrieve the child from the vehicle 120.

Figure 3:
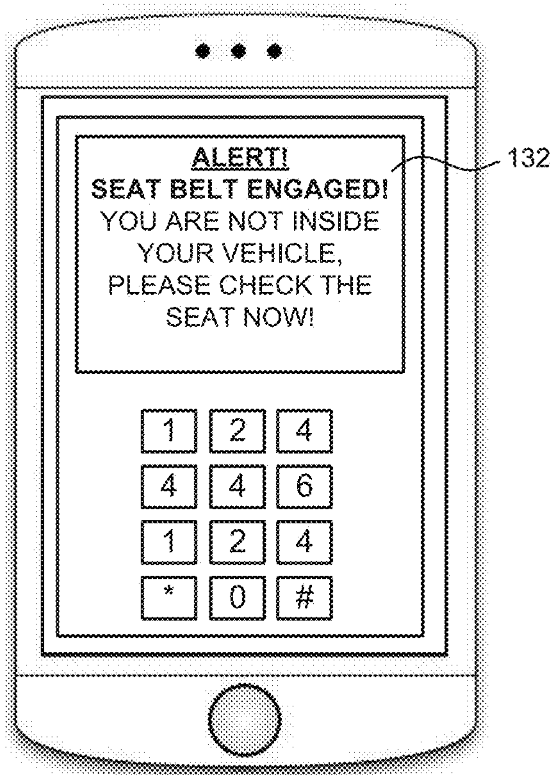
FIG. 3 illustrates a mobile device interface for receiving seat belt status alerts according to example embodiments.

FIG. 3 illustrates a mobile device interface 300 for receiving seat belt status alerts according to example embodiments. Referring to FIG. 3, the mobile device 130 may receive a message when the BLUETOOTH signal between the device 130 and the buckle configuration 110 has been lost. A message may also be sent to the device when the vehicle has stopped for a period of time and/or the GPS information indicates the destination has been reached. The message may be an alert 132 to check the status of the seat belt.

In another example, once the seat belt connection component and the monitoring device are in communication and the two components lose their BLUETOOTH connection or the vehicle has stopped moving for a period of time (e.g., 2, 3, 5, N minutes), the mobile device 130 will then begin to produce an alarm informing the user that the connection is lost and the seat belt unit 110 is still believed to be connected. If the tongue 112 and buckle 114 are disconnected manually, then the communication signal will be deactivated resulting in no alarm. The connection may enable a signal to be transmitted from the unit 110 to the other devices. When the connection is open and no contact is made, the unit 110 may become inoperable. The components of the notification buckle unit 110 may be powered by a replaceable battery or rechargeable battery or may be powered by a constant power source provided by the vehicle. When the vehicle 120 is turned off and the tongue and buckle are still connected and the mobile device 130 moves away from the vehicle 120, then the vehicle 120 will start to beep the horn and flash the lights as it may receive a notification of the active seat belt status being connected by the unit 110 itself or from a notification sent form the mobile device 130. The vehicle 120 may also identify a weight on the seat or a movement made on or near the seat to determine whether a person is still present in one or more of the seats.

The software application on the mobile device 130 may be able to connect to other devices and permit additional users to receive status alerts, as any phone number to include with the alert may be entered into the mobile device application and may be called when a notification is necessary. GPS may provide tracking of the mobile device 130 while the buckle is in a closed and locked position. If the vehicle 120 is carjacked/stolen or for some reason someone takes possession of the vehicle 120 without permission and not knowing children are in the back seat, this configuration can offer tracking for reporting and policing purposes and may provide an easy way for authorities to track children in stolen vehicles. Also, if the child is in the vehicle with a nanny, grandparent, friend or family member, the application will be able to provide updates regarding a current route that is expected and/or other real time information. The GPS tracking will offer vehicle speed updates to ensure whoever is driving is following all highway rules.

A child or baby seat can have a separate affixing/locking portion, male and/or female locking member with heavy snaps instead of straps to alleviate children grabbing and pulling those portions off. A hard plastic snap button may be used to lock the seat securing portions. There could also be an integrated system that is built into the current buckle compartment or which is easily removable in favor of a new compartment as hardware upgrades are made over time. Such a device can be inserted like a small box or FOB device equipped with radio communications, integrated into the current seat or sold separately as an add-on when buying the car seat. When the baby seat is upgraded to a booster seat, the seat belts that are installed by the vehicle manufacturer will be used instead of the baby seat belt fastener. In such a case, a separate dongle may be installed or a compartment may be integrated into the vehicle seat belt that communicates with the vehicle and the corresponding system application.

In one example, the alarms and/or notifications that are enacted by the sensor information may all use a timestamp or clock that is initiated as part of a time tracking process at the onset of the notification process. After a period of time, such as time threshold ($T_{th}$) since the time tracking has begun, the vehicle control system or application system will automatically start the vehicle and initiate a climate control option, such as cold air, warm air or other vehicle climate control options to maintain a suitable environment for a child. The notifications that are sent may be required to receive a relief option, such as a door opening, a noise sensor reading, a phone application confirmation option, etc. When those confirmations are not received by the system application, the application may initiate either cool or warm temperature controls on the vehicle depending on the temperature outside.

In another example, the application may use GPS coordinates to identify known location, such as home, work, daycare, grandparents, etc. to alert users when they have either arrived at a known destination or left a known destination and at what time they arrived or will arrived. Also, a diameter function may be used for a known common area so that when a user has moved outside that particular area, the user(s) will be alerted via preferred notification options that they have moved outside the designated area set by the user application.

Figure 4:
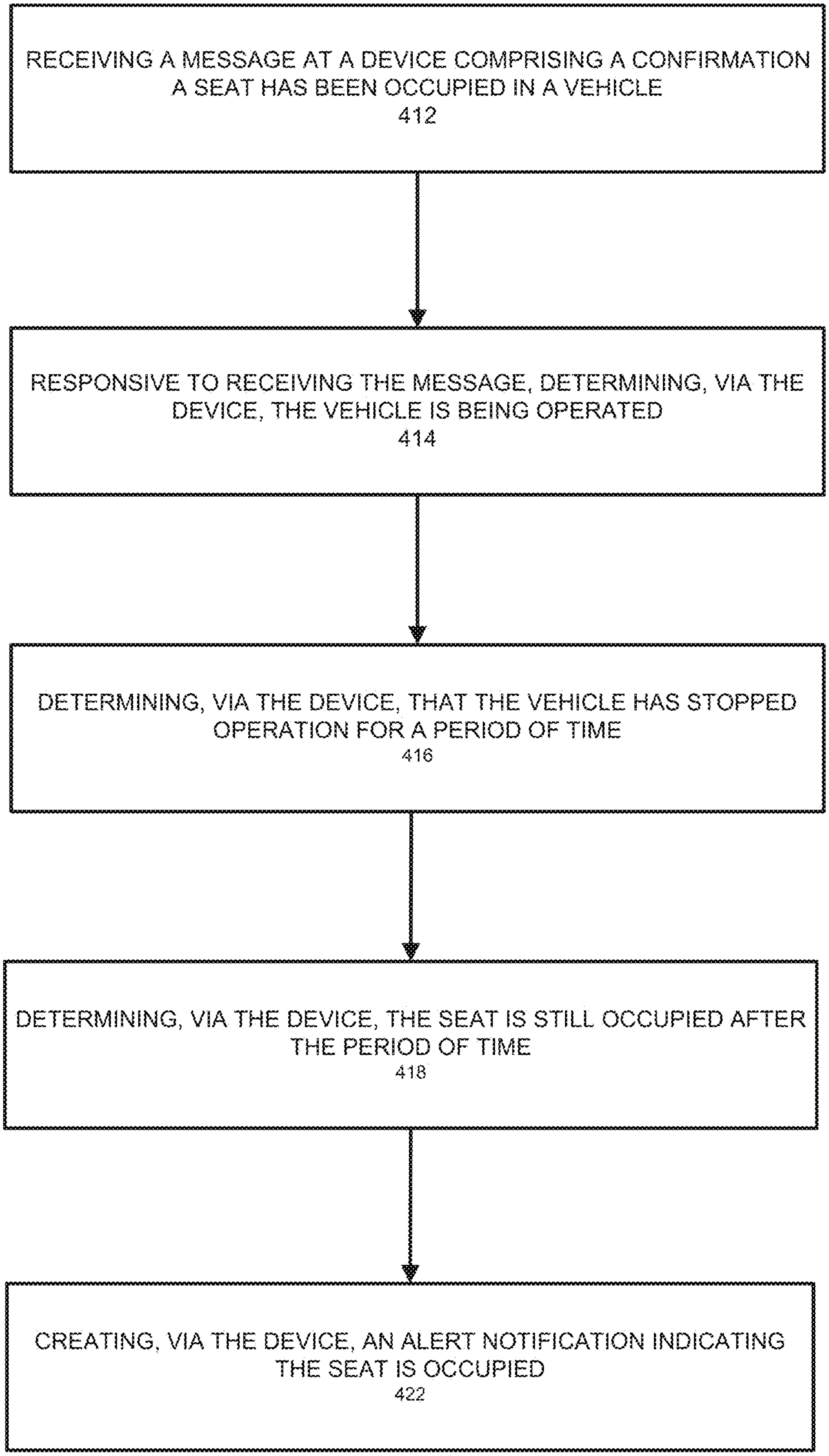
FIG. 4 illustrates an example method of operating a seat notification configuration.

FIG. 4 illustrates an example method of operation. Referring to FIG. 4, the example may include receiving a message at a device comprising a confirmation a seat has been occupied in a vehicle 412. In this operation, the device may be a mobile device or the vehicle and the message may be sent wirelessly and may include information, such as a time stamp of a current time or begin time. The process may also include responsive to receiving the message, determining, via the device, the vehicle is being operated 414, such as by a GPS tracking feature that confirms the device is moving in a vehicle by movement data analysis, a speed measurement analysis, accelerometer data, etc. Other relevant vehicle data may be vibration, noise, etc. The process may also include determining, via the device, that the vehicle has stopped operation for a period of time 416. The process may also include determining, via the device, the seat is still occupied after the period of time 418 and creating, via the device, an alert notification indicating the seat is occupied 422.

The vehicle stop determination may be based on acceleration data, GPS data, and other sensor data. The mobile device application may be listening to the vehicle, tracking GPS location data and receiving periodic beacon data from the seat buckle unit 110 indicating that it is still engaged. When the vehicle is off, it is important to notify the user of the mobile device 130 that the buckle is still engaged, especially when the mobile device has moved away from the vehicle. The process may also include creating the message via a monitoring device disposed in a buckle of the seat, transmitting the message via the monitoring device to one or more of the device and the vehicle, responsive to determining the seat is occupied, monitoring, via the device, a seat belt status associated with the seat until a change in vehicle status, and determining to create the alert, via the device, when the vehicle status has changed from being operated to the stopped operation and when the seat belt status is engaged and the device has exceeded a distance between the device and the vehicle.

The seat belt status may be monitored by a sensor affixed to a buckle of the seat belt. The message may be transmitted wirelessly from a communication module disposed in a portion of a seat belt buckle associated with the seat to the device. The device may be a mobile device operated by a user of the vehicle. The vehicle may receive the message and the vehicle may perform one or more of honking a horn and starting the car or other indication operations to notify users near the vehicle. The process may also include determining, via the device, the seat is still occupied after the period of time comprises receiving another message at the device indicating a seat belt buckle is still engaged.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 5:
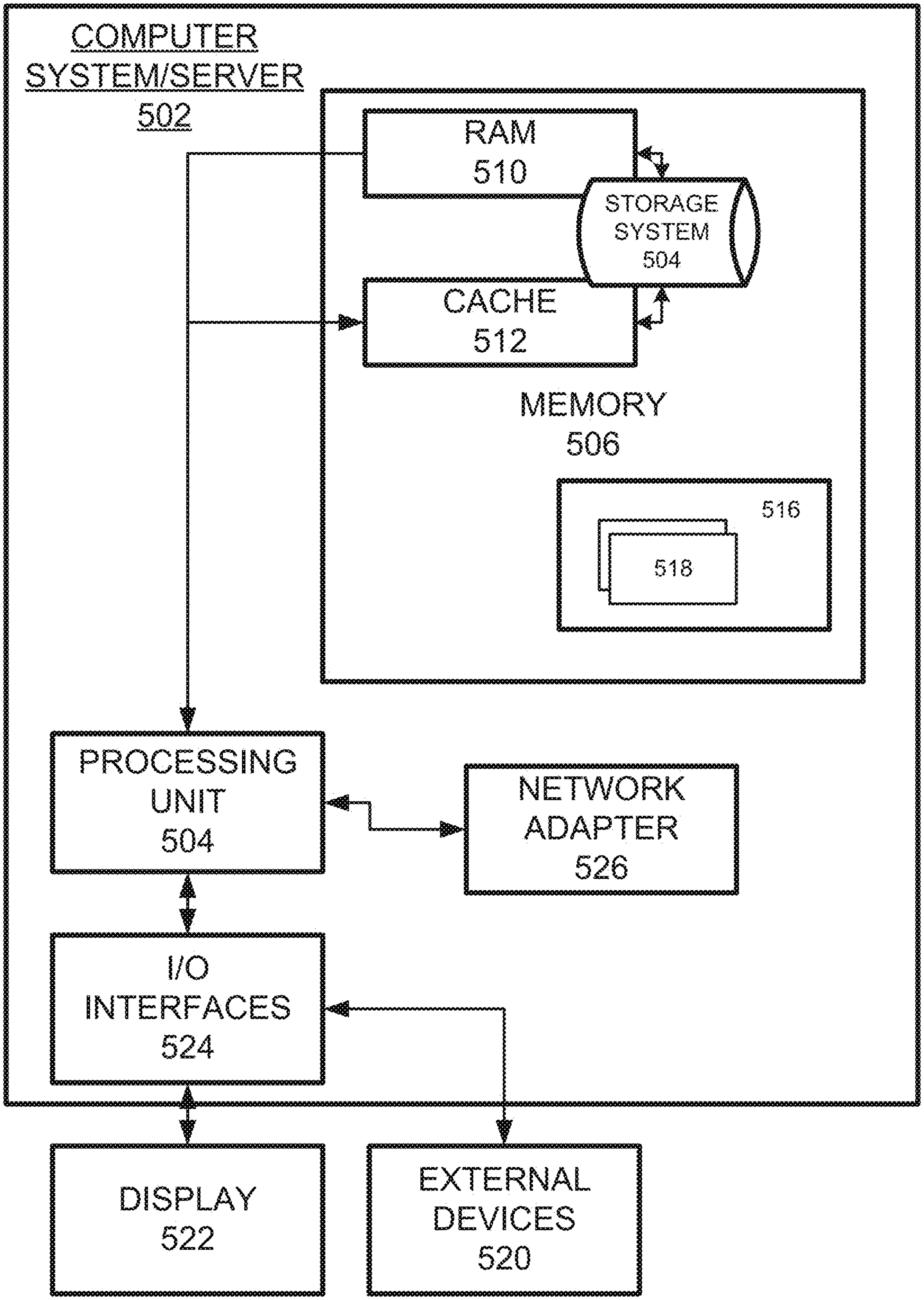
FIG. 5 illustrates an example network entity device configured to store instructions, software, and corresponding hardware for executing the same, according to example embodiments.

FIG. 5 illustrates an example computer system configured to perform one or more example processes according to the present invention. FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:

receiving a message at a device comprising a confirmation a seat has been occupied in a vehicle;

responsive to receiving the message, determining, via the device, the vehicle is being operated;

determining, via the device, that the vehicle has stopped operation for a period of time;

determining, via the device, the seat is still occupied after the period of time;

creating, via the device, an alert notification indicating the seat is occupied responsive to the vehicle status changing to the stopped operation, remaining stationary for the period of time, a seat belt buckle status being engaged, and the device exceeding a threshold distance between the device and the vehicle; and based on a wireless transmission signal emitted from a circuit of the seat belt buckle, sending the alert to the device and sending the alert to the vehicle enabling one or more of a vehicle horn activation, vehicle startup activation and vehicle lights activation, and receiving additional data at the device indicating an amount of time the seat belt buckle has been closed while the seat belt buckle is in a closed position.

2. The method of claim 1, wherein the seat belt status is monitored by a sensor affixed to a buckle of the seat belt.

3. The method of claim 1, wherein the message is transmitted wirelessly from a communication module disposed in a portion of a seat belt buckle associated with the seat to the device.

4. The method of claim 1, wherein the device is a mobile device operated by a user of the vehicle.

5. The method of claim 1, wherein the determining, via the device, the seat is still occupied after the period of time comprises receiving another message at the device indicating a seat belt buckle is still engaged.

6. A device comprising:

a receiver configured to receive a message comprising a confirmation a seat has been occupied in a vehicle; and a processor configured to responsive to the message being received, determine the vehicle is being operated;

determine that the vehicle has stopped operation for a period of time;

determine the seat is still occupied after the period of time;

create an alert notification indicating the seat is occupied responsive to the vehicle status changing to the stopped operation, remaining stationary for the period of time, a seat belt buckle status being engaged, and the device exceeding a threshold distance between the device and the vehicle; and based on a wireless transmission signal emitted from a circuit of the seat belt buckle, receive the alert at the device and send the alert to the vehicle enabling one or more of a vehicle horn activation, vehicle startup activation and vehicle lights activation, and receive additional data at the device indicating an amount of time the seat belt buckle has been closed while the seat belt buckle is in a closed position.

7. The device of claim 6, wherein the seat belt status is monitored by a sensor affixed to a buckle of the seat belt.

8. The device of claim 6, wherein the message is transmitted wirelessly from a communication module disposed in a portion of a seat belt buckle associated with the seat to the device.

9. The device of claim 6, wherein the device is a mobile device operated by a user of the vehicle.

10. The device of claim 6, wherein the seat is determined to still be occupied after the period of time by receiving another message at the device indicating a seat belt buckle is still engaged.

11. A non-transitory computer readable storage medium configured to store instructions that when executed cause a processor to perform:

receiving a message at a device comprising a confirmation a seat has been occupied in a vehicle;

responsive to receiving the message, determining, via the device, the vehicle is being operated;

determining, via the device, that vehicle has stopped operation for a period of time;

determining, via the device, the seat is still occupied after the period of time;

creating, via the device, an alert notification indicating the seat is occupied responsive to the vehicle status changing to the stopped operation, remaining stationary for the period of time, a seat belt buckle status being engaged, and the device exceeding a threshold distance between the device and the vehicle; and based on a wireless transmission signal emitted from a circuit of the seat belt buckle, sending the alert to the device and sending the alert to the vehicle enabling one or more of a vehicle horn activation, vehicle startup activation and vehicle lights activation, and receiving additional data at the device indicating an amount of time the seat belt buckle has been closed while the seat belt buckle is in a closed position.

12. The non-transitory computer readable storage medium of claim 11, wherein the seat belt status is monitored by a sensor affixed to a buckle of the seat belt.

13. The non-transitory computer readable storage medium of claim 11, wherein the message is transmitted wirelessly from a communication module disposed in a portion of a seat belt buckle associated with the seat to the device.

14. The non-transitory computer readable storage medium of claim 11, wherein the device is a mobile device operated by a user of the vehicle.

* * * * *